United States Patent
Oh et al.

(10) Patent No.: US 11,314,137 B2
(45) Date of Patent: Apr. 26, 2022

(54) SYSTEMS AND METHODS FOR IMPLEMENTING A DISPLAY DEVICE WITH SIDE LIGHTING

(71) Applicant: Dell Products L.P., Round Rock, TX (US)

(72) Inventors: Guentaek Oh, Singapore (SG); Yong-Gu Kang, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/029,455

(22) Filed: Sep. 23, 2020

(65) Prior Publication Data

US 2022/0091447 A1    Mar. 24, 2022

(51) Int. Cl.
| | |
|---|---|
| *F21V 8/00* | (2006.01) |
| *G02F 1/137* | (2006.01) |
| *G02F 1/1334* | (2006.01) |
| *G02F 1/1333* | (2006.01) |

(52) U.S. Cl.
CPC ............ *G02F 1/137* (2013.01); *G02B 6/005* (2013.01); *G02F 1/1334* (2013.01); *G02F 1/133308* (2013.01); *G02F 2203/055* (2013.01)

(58) Field of Classification Search
CPC .. G02F 1/137; G02F 1/1334; G02F 1/133308; G02F 2203/055; G02B 6/005
See application file for complete search history.

(56) References Cited

U.S. PATENT DOCUMENTS

| | | | |
|---|---|---|---|
| 6,271,899 B1 * | 8/2001 | Lewis | G02F 1/1334 349/86 |
| 2020/0064664 A1 * | 2/2020 | Cho | G02F 1/1334 |

* cited by examiner

*Primary Examiner* — Donald L Raleigh
(74) *Attorney, Agent, or Firm* — Jackson Walker L.L.P.

(57) ABSTRACT

A display device for displaying at least one of graphical information and alphanumeric data may include a housing, a display housed within the housing, a backlight housed within the housing and for generating visible light to illuminate the display, a light guide plate coupled between the display and the backlight within the housing and configured to guide the visible light generated by the backlight, a laminate exposed through the housing and covering a portion of the light guide plate, wherein the laminate has a variable optical transmittance based on a voltage applied to the laminate, and a controller housed within the housing and configured to control the voltage applied to the laminate in order to control the variable optical transmittance and modulate emission of light generated by the backlight transmitted through the laminate.

14 Claims, 2 Drawing Sheets

SYSTEMS AND METHODS FOR IMPLEMENTING A DISPLAY DEVICE WITH SIDE LIGHTING

TECHNICAL FIELD

The present disclosure relates in general to information handling systems, and more particularly to implementing a display device with side lighting.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include display devices, either communicatively coupled to an information handling system via a cable or integrated within the information handling system enclosure itself (e.g., in the case of a notebook or tablet computer). One popular way of implementing a display device is as a liquid-crystal display (LCD) illuminated with a light-emitting diode (LED) backlight.

A growing trend in displays is a display that displays graphical and/or alphanumeric data on a display screen while also having side lighting (sometimes referred to as ambient lighting) that emits light of one or more colors through the side and/or reverse of the display.

To further illustrate, FIG. 1A illustrates a display monitor 100 configured to have side lighting, as is known in the art. FIG. 1B illustrates display monitor 100 taken along section a-a shown in FIG. 1A. As shown in FIG. 1B, existing approaches for providing side lighting use an optically-transparent material 102 (e.g., clear plastic) and one or more light-emitting diodes (LEDs) 104 to emit light that passes through such optically-transparent material. Such LEDs 104 are in addition to any LED backlight 106 used in connection with displaying graphical and/or alphanumeric data on a display screen 108. Accordingly, such LEDs 104 may require additional control circuitry beyond that used in connection with displaying graphical and/or alphanumeric data on a display screen 108, which may lead to complicated and bulky designs.

SUMMARY

In accordance with the teachings of the present disclosure, the disadvantages and problems associated with traditional display devices with side lighting may be reduced or eliminated.

In accordance with embodiments of the present disclosure, a display device for displaying at least one of graphical information and alphanumeric data may include a housing, a display housed within the housing, a backlight housed within the housing and for generating visible light to illuminate the display, a light guide plate coupled between the display and the backlight within the housing and configured to guide the visible light generated by the backlight, a laminate exposed through the housing and covering a portion of the light guide plate, wherein the laminate has a variable optical transmittance based on a voltage applied to the laminate, and a controller housed within the housing and configured to control the voltage applied to the laminate in order to control the variable optical transmittance and modulate emission of light generated by the backlight transmitted through the laminate.

In accordance with these and other embodiments of the present disclosure, a method for constructing a display device for displaying at least one of graphical information and alphanumeric data may include housing a display in a housing, housing a backlight within the housing and for generating visible light to illuminate the display, coupling a light guide plate between the display and the backlight within the housing and configured to guide the visible light generated by the backlight, covering a portion of the light guide plate with a laminate and exposing the laminate through the housing wherein the laminate has a variable optical transmittance based on a voltage applied to the laminate, and communicatively coupling a controller housed in the housing to the laminate wherein the controller is configured to control the voltage applied to the laminate in order to control the variable optical transmittance and modulate emission of light generated by the backlight transmitted through the laminate.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 2:
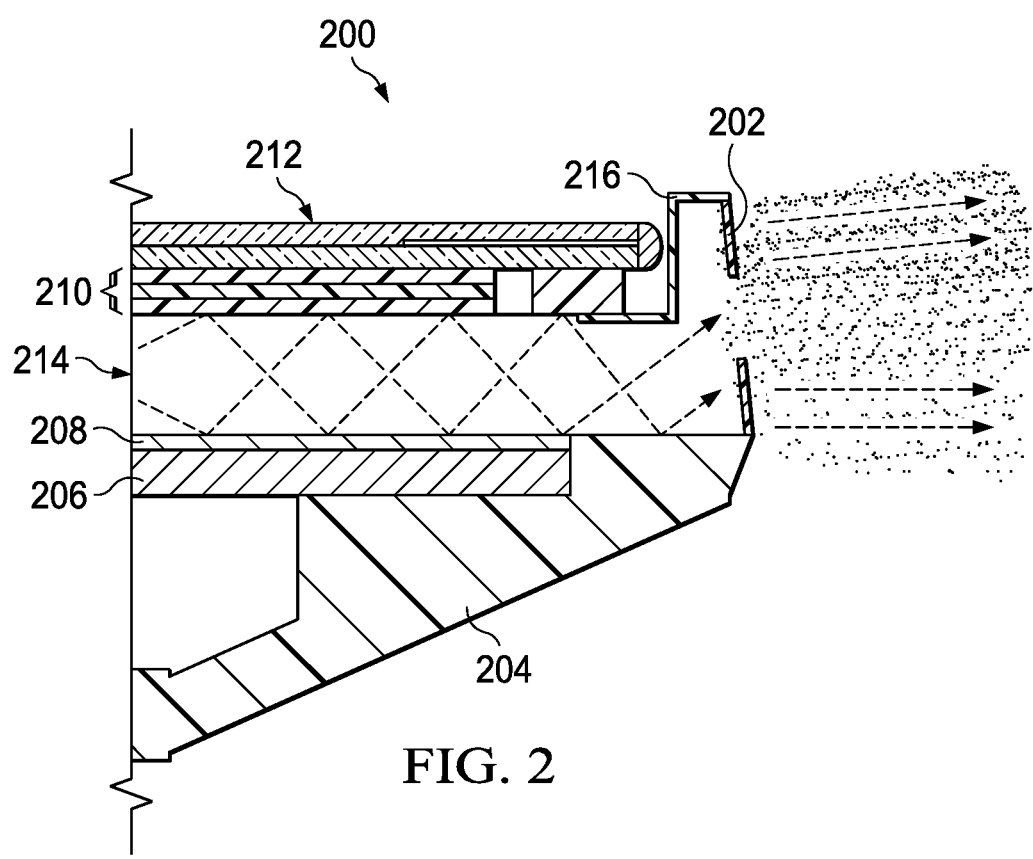
FIG. 2 illustrates a display monitor configured to have side lighting using a variably optically transmissive material, in accordance with certain embodiments of the present disclosure.

Preferred embodiments and their advantages are best understood by reference to FIG. 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1A:
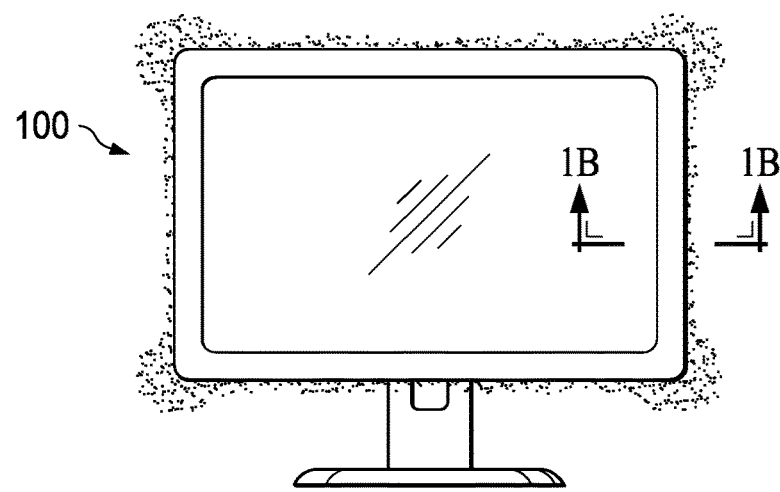
FIG. 1A illustrates a display monitor configured to have side lighting, as is known in the art.
Figure 1B:
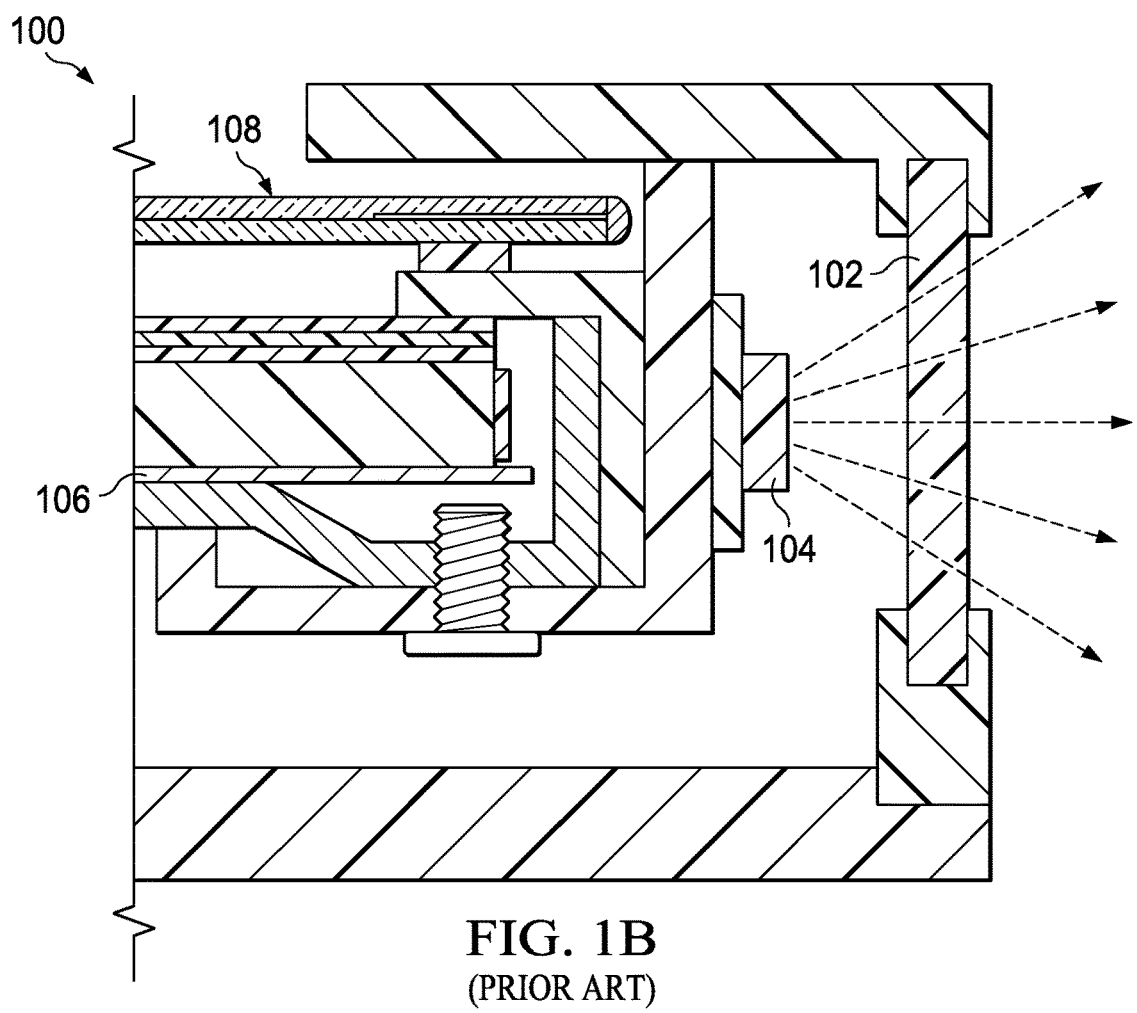
FIG. 1B illustrates the display monitor of FIG. 1A taken along section a-a shown in FIG. 1A, as is known in the art.

FIG. 2 illustrates a cross-sectional view of a display monitor 200 configured to have side lighting using a laminate 202 of variably optically transmissive material, in accordance with certain embodiments of the present disclosure. The view of FIG. 2 may be taken along a cross section of display monitor 200 similar to the section a-a taken in FIG. 1A. As shown in FIG. 2, display monitor 200 may include a housing 204, a controller 206, a backlight 208, a liquid crystal display (LCD) 210, a cover 212, and a light guide plate 214.

Housing 204 may include any suitable chassis, enclosure, housing, and/or container for components of display monitor 200, and may be formed from any suitable material (e.g., plastic, metal, carbon fiber, or a combination thereof).

Backlight 208 may comprise any system, device, or apparatus configured to generate light that may be modulated by LCD 210 in order to generate a display of graphical and/or alphanumeric data. In some embodiments, backlight 208 may be implemented as a plurality of light-emitting diodes (LEDs).

LCD 210 may comprise any suitable system, device, or apparatus configured to display human-perceptible graphical data and/or alphanumeric data on display monitor 200. As is known in the art, LCD 210 may include an array of liquid crystals configured to modulate light generated by backlight 208 in order to create graphical data and/or alphanumeric data on LCD 210. Although FIG. 2 specifically depicts LCD 210, in some embodiments display monitor 200 may include a display device other than an LCD.

Cover 212 may comprise any suitable optically-transparent material (e.g., glass) configured to mechanically couple to housing 204 in order to enclose and protect from damage the various components of display monitor 200. Due to its optically-transparent material, human-perceptible graphical data and/or alphanumeric data generated by LCD 210 may be seen through cover 212.

Light guide plate 214 may comprise any suitable optically-transparent material (e.g., acrylic panel typically made from pure poly methyl methacrylate), configured to direct light in one or more desired directions within display monitor 200.

Further as shown in FIG. 2, light guide plate 214 may be laminated on an edge thereof with laminate 202 comprised of selectively optically transmissive material. Selectively optically transmissive material may comprise any suitable material in which the optical transparency of such material may be modulated based on a voltage applied to such material. For example, in some embodiments, laminate 202 may be comprised of a polymer-dispersed liquid crystal (PDLC) film, which is predominantly opaque (e.g., less than five percent optical transmittance) when no voltage is applied to the material, but is predominantly transparent (e.g., 75 percent or more optical transmittance) when a voltage above a threshold is applied to the material. In some embodiments, optical transmittance of laminate 202 may be continuously varied or varied in steps between a minimum transmittance or maximum transmittance based on the voltage applied. In these and other embodiments, optical transmittance of laminate 202 may be controlled in a frequency-selective manner, such that optical transmittance of particular wavelengths of light is varied based on voltage, thus allowing selectivity of the color of light emitting through laminate 202 (e.g., by using one or more instances of laminate 202, each having a different frequency selectivity of light).

Controller 206 may be communicatively coupled to backlight 208, LCD 210, and laminate 202, and comprise any system, device, or apparatus configured to control operation of backlight 208 (e.g., controlling an intensity of light generated by backlight 208), LCD 210 (control individual liquid crystals of LCD 210 in order to modulate the light generated by backlight 208, thus creating a display of graphical data and/or alphanumeric data on LCD 208), and laminate 202 (e.g., controlling a voltage applied to laminate 202 in order to modulate an optical transmittance of laminate 202).

As shown in FIG. 2, a desired portion of light guide plate 214 may be obscured by material 216 (e.g., additional portions of housing 204, printing of black ink, etc.), to prevent undesirable emission of light from light guide plate 214 other than that through laminate 202.

Accordingly, laminate 202 may be controlled by material 216 to vary a presence, intensity, and/or color of side lighting from display monitor 200. In addition, the approaches described above with respect to FIG. 2 may also enable a simpler construction of a display monitor with side lighting as compared to existing approaches. For example, instead of requiring a second backlight source for side lighting, display monitor 200 in effect "recycles" backlight 208 as the source of the side lighting, which may reduce design complexity and size of display monitor 200 compared to existing approaches.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A display device for displaying at least one of graphical information and alphanumeric data, comprising:
    a housing;
    a display housed within the housing;
    a backlight housed within the housing and for generating visible light to illuminate the display;
    a light guide plate coupled between the display and the backlight within the housing and configured to guide the visible light generated by the backlight;
    a laminate, exposed to atmosphere through the housing and covering an edge portion of the light guide plate, to transmit a portion of the visible light at the edge portion of the light guide plate to provide side lighting, wherein the laminate has a variable optical transmittance based on a voltage applied to the laminate; and
    a controller housed within the housing and configured to control the voltage applied to the laminate in order to control the variable optical transmittance and modulate emission of light generated by the backlight transmitted through the laminate.

2. The display device of claim 1, wherein the display is a liquid crystal display.

3. The display device of claim 1, wherein the backlight is a light-emitted diode backlight.

4. The display device of claim 1, wherein the laminate comprises a polymer-dispersed liquid crystal film.

5. The display device of claim 1, wherein the laminate is frequency-selective based on the voltage applied to the laminate.

6. The display device of claim 5, wherein the laminate comprises a plurality of instances of laminate, each having a different frequency-selectivity of light.

7. The display device of claim 5, wherein the controller is configured to control the voltage applied to the laminate in order to control a frequency of light transmitted through the laminate.

8. A method for constructing a display device for displaying at least one of graphical information and alphanumeric data, comprising:
    housing a display in a housing;
    housing a backlight within the housing and for generating visible light to illuminate the display;
    coupling a light guide plate between the display and the backlight within the housing and configured to guide the visible light generated by the backlight;
    covering an edge portion of the light guide plate with a laminate and exposing the laminate to atmosphere through the housing to transmit a portion of the visible light at the edge portion of the light guide plate to provide side lighting and, wherein the laminate has a variable optical transmittance based on a voltage applied to the laminate; and
    a laminate, exposed through the housing and covering an edge portion of the light guide plate, to transmit a portion of the visible light at the edge portion of the light guide plate to provide side lighting, wherein the laminate has a variable optical transmittance based on a voltage applied to the laminate; and
    communicatively coupling a controller housed in the housing to the laminate wherein the controller is configured to control the voltage applied to the laminate in order to control the variable optical transmittance and modulate emission of light generated by the backlight transmitted through the laminate.

9. The method of claim 8, wherein the display is a liquid crystal display.

10. The method of claim 8, wherein the backlight is a light-emitted diode backlight.

11. The method of claim 8, wherein the laminate comprises a polymer-dispersed liquid crystal film.

12. The method of claim 8, wherein the laminate is frequency-selective based on the voltage applied to the laminate.

13. The method of claim 12, wherein the laminate comprises a plurality of instances of laminate, each having a different frequency selectivity of light.

14. The method of claim 12, wherein the controller is configured to control the voltage applied to the laminate in order to control a frequency of light transmitted through the laminate.

* * * * *